Figure 1:
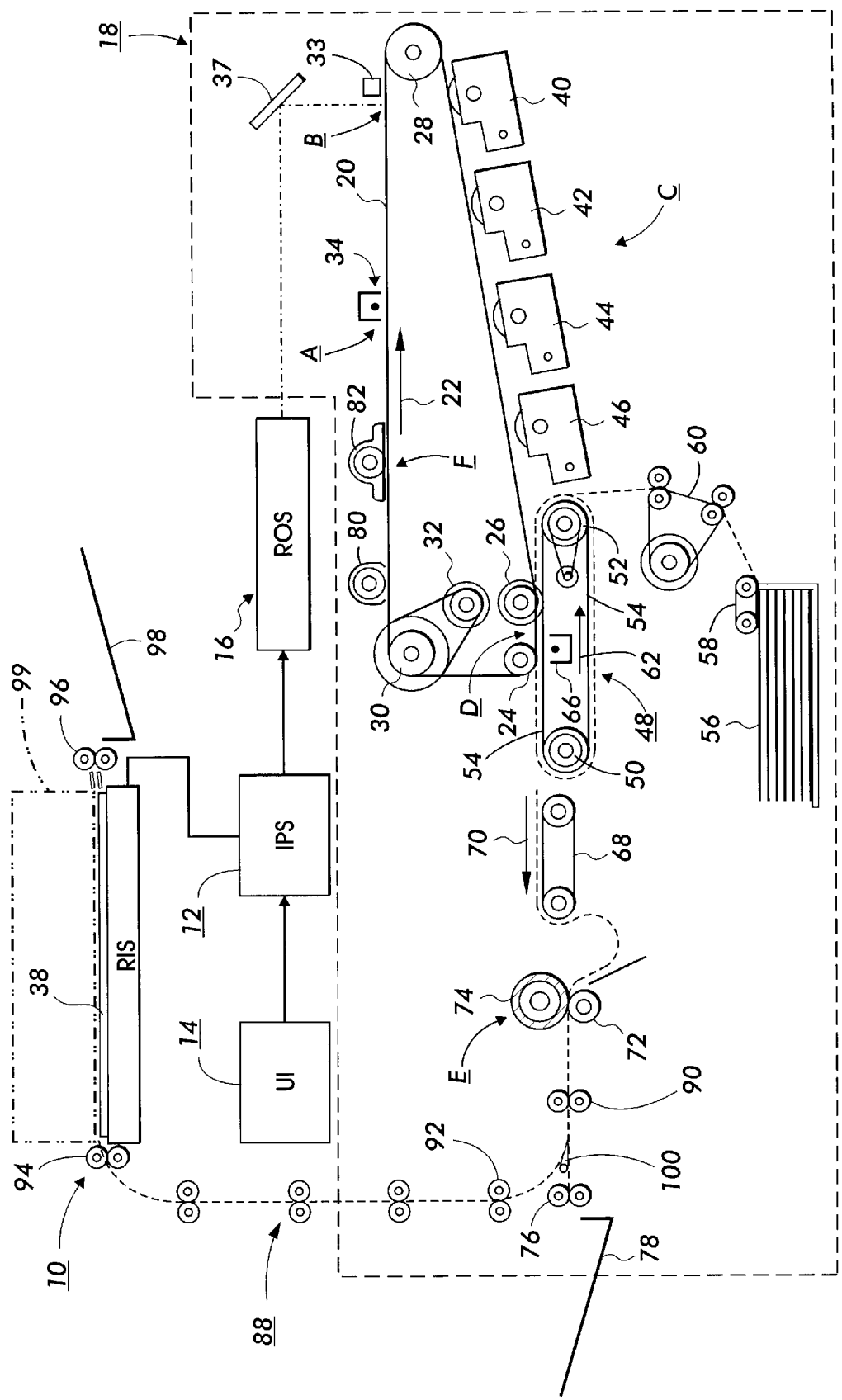

United States Patent [19]
Mestha et al.

[11] Patent Number: 5,884,118
[45] Date of Patent: *Mar. 16, 1999

[54] PRINTER HAVING PRINT OUTPUT LINKED TO SCANNER INPUT FOR AUTOMATED IMAGE QUALITY ADJUSTMENT

[75] Inventors: Lingappa K. Mestha, Fairport; David A. Mantell, Rochester, both of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 756,739

[22] Filed: Nov. 26, 1996

[51] Int. Cl.⁶ .................................................. G03G 15/00
[52] U.S. Cl. .............................................. 399/15; 399/72
[58] Field of Search ................... 399/14, 15, 72, 399/405, 139

[56] References Cited

U.S. PATENT DOCUMENTS

| | | | |
|---|---|---|---|
| 3,936,180 | 2/1976 | Willard et al. | 399/10 |
| 4,007,326 | 2/1977 | Bernsen | 358/405 |
| 4,391,504 | 7/1983 | Acquaviva | 399/139 |
| 4,710,785 | 12/1987 | Mills | 347/129 |
| 5,095,332 | 3/1992 | Ohnishi et al. | 399/10 |
| 5,229,815 | 7/1993 | Sulenski . | |
| 5,271,096 | 12/1993 | Cook | 395/131 |
| 5,282,053 | 1/1994 | Robideau | 358/406 |
| 5,510,896 | 4/1996 | Wafler | 358/296 |

FOREIGN PATENT DOCUMENTS 07-334042  12/1995  Japan .

*Primary Examiner*—Robert Beatty
*Attorney, Agent, or Firm*—Ronald F. Chapuran

[57] ABSTRACT

An imaging machine operating components include an input scanner for providing images on copy sheets and a copy sheet path connected to the input scanner. The imaging machine is calibrated by providing an image on a first copy sheet and automatically conveying the first copy sheet to the input scanner by way of the copy path. The image on the first copy sheet is scanned and provides the image on a second copy sheet. The image on the second copy sheet is sensed and compared to a reference image to calibrate the imaging machine. The calibration sequence is automatically initiated via control data stored in a memory.

17 Claims, 2 Drawing Sheets

PRINTER HAVING PRINT OUTPUT LINKED TO SCANNER INPUT FOR AUTOMATED IMAGE QUALITY ADJUSTMENT

This invention relates generally to an electrostatographic printing machine and, more particularly, concerns the linking of the machine output to the document scanner input for automated image quality improvement.

The ultimate goal of the digital printing system is to deliver outstanding print quality in both black and color output independent of media. Due to variabilities in marking process and material properties, it is likely that the print quality is prone to drift with time. This simply means that multiple copies of the same image from the same printer do not look consistent. To ensure consistency, in some printers, some of the internal process parameters are measured by creating predefined images in interdocument zones to adjust the actuator values. Sometimes on-line densitometers are used to measure colorimetric values in color printers. Electrostatic Voltmeters and Optical sensors are often used for printers based on xerographic print engines. All these sensors, although giving some information about the state of the internal process, fail to give full information about the quality of the real image that is printed on a paper. Most systems enable some calibration based on the output (printed) image. These processes are usually lengthy and require considerable operator intervention.

Typical prior art calibration systems include U.S. Pat. No. 5,282,053 disclosing a calibration strip of patches of various density levels for scanning and storing signals in a pixel threshold table for comparing to signals of scanned documents. U.S. Pat. No. 5,229,815 discloses a technique for automatically suspending and restarting an image quality adjustment process. U.S. Pat. No. 5,271,096 discloses a technique of storing and printing out a calibration image as a resultant calibration picture. The resultant calibration picture is then input to the system again to create a resultant calibration image. A comparison is made between the original calibration picture and the resultant calibration picture to yield calibration data. The calibration data is then used in a correction stage to correct a picture input to the system to provide an anti distorted output picture substantially identical to the input picture.

A difficulty with the prior art systems, as discussed above, is the inability to give full information about the quality of the real image printed on paper or the systems are not automatic, that is, cannot sufficiently calibrate the system without considerable effort and operator intervention.

It is an object of the present invention, therefore, to provide a calibration system for automatically allowing printed images to be scanned without operator intervention by providing a paper path to connect the output (printed) image to the paper path of an input document scanner. It is another object of the present invention to provide a system in which a scanned image can be selectively used to determine nonuniformity problems to obtain color consistency within a page. Further advantages of the present invention will become apparent as the following description proceeds, and the features characterizing the invention will be pointed out with particularity in the claims annexed to and forming a part of this specification.

SUMMARY OF THE INVENTION

The present invention relates to an imaging machine for providing images on copy sheets having operating components including an input scanner and a copy sheet path connected to the input scanner. The imaging machine is calibrated by projecting a test pattern to a first copy sheet and conveying the first copy sheet to the input scanner by means of the copy sheet path connected to the input scanner. The test pattern can be provided from a hardcopy source or the test pattern can be stored electronically in machine memory. The test pattern image on the first copy sheet is scanned and provides a test pattern image on a second copy sheet. The test pattern image on the second copy sheet is sensed and compared to a reference image or the test pattern image on the first copy sheet to calibrate the imaging machine.

Figure 2:
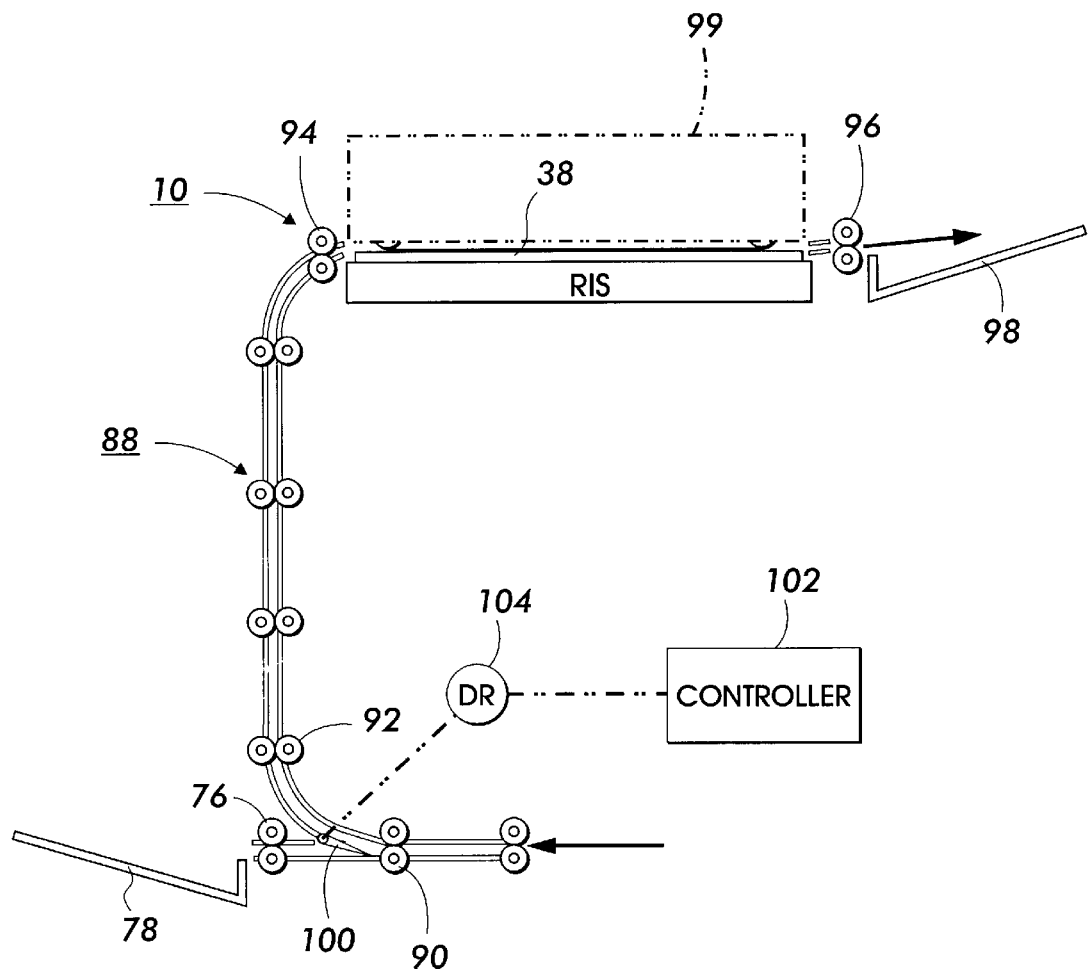

Other features of the present invention will become apparent as the following description proceeds and upon reference to the drawings, in which:

FIG. 1 is a schematic elevational view of an exemplary multi-color electrophotographic printing machine including a paper path to connect the output (printed) image to the paper path of the input document scanner in accordance with the present invention;

FIG. 2 is a more detailed schematic of the paper path connecting the output (printed) image to the paper path of the input document scanner in accordance with the present invention; and A schematic elevational view showing an exemplary electrophotographic printing machine incorporating the features of the present invention therein is shown in FIG. 1. It will become evident from the following discussion that the present invention is equally well-suited for use in a wide variety of printing systems including ionographic printing machines, ink jet printers, and discharge area development systems, as well as other more general non-printing systems providing multiple or variable outputs such that the invention is not necessarily limited in its application to the particular system shown herein.

To initiate the copying process, a multicolor original document 38 is positioned on a raster input scanner (RIS), indicated generally by the reference numeral 10. The RIS 10 contains document illumination lamps, optics, a mechanical scanning drive, and a charge coupled device (CCD array) for capturing the entire image from original document 38. The RIS 10 converts the image to a series of raster scan lines and measures a set of primary color densities, such as red, green and blue densities, at each point of the original document. This information is transmitted as an electrical signal to an image processing system (IPS), indicated generally by the reference numeral 12, which converts a set of density signals such as red, green and blue density signals to a set of colorimetric coordinates. The IPS contains control electronics for preparing and managing the image data flow to a raster output scanner (ROS), indicated generally by the reference numeral 16.

A user interface (Ul), indicated generally by the reference numeral 14, is provided for communicating with IPS 12. Ul 14 enables an operator to control the various operators adjustable functions whereby the operator actuates the appropriate input keys of Ul 14 to adjust the parameters of the copy. Ul 14 may be a touch screen, or any other suitable device for providing an operator interface with the system. The output signal from Ul 14 is transmitted to IPS 12 which then transmits signals corresponding to the desired image to ROS 16.

ROS 16 includes a laser with rotating polygon mirror blocks. The ROS 16 illuminates, via mirror 37, a charged portion of a photoconductive belt 20 of a printer or marking engine, indicated generally by the reference numeral 18. Preferably, a multi-facet polygon mirror is used to illuminate the photoreceptor belt 20 at a rate of about 400 pixels per inch. The ROS 16 exposes the photoconductive belt 20 to record a set of three subtractive primary latent images thereon corresponding to the signals transmitted from IPS 12. One latent image is to be developed with cyan developer material, another latent image is to be developed with magenta developer material, and the third latent image is to be developed with yellow developer material. These developed images are subsequently transferred to a copy sheet in superimposed registration with one another to form a multicolored image on the copy sheet which is then fused thereto to form a color copy. This process will be discussed in greater detail hereinbelow.

With continued reference to FIG. 1, marking engine 18 is an electrophotographic printing machine comprising photoconductive belt 20 which is entrained about transfer rollers 24 and 26, tensioning roller 28, and drive roller 30. Drive roller 30 is rotated by a motor or other suitable mechanism coupled to the drive roller 30 by suitable means such as a belt drive 32. As roller 30 rotates, it advances photoconductive belt 20 in the direction of arrow 22 to sequentially advance successive portions of the photoconductive belt 20 through the various processing stations disposed about the path of movement thereof.

Photoconductive belt 20 is preferably made from a polychromatic photoconductive material comprising an anti-curl layer, a supporting substrate layer and an electrophotographic imaging single layer or multi-layers. The imaging layer may contain homogeneous, heterogeneous, inorganic or organic compositions. Preferably, finely divided particles of a photoconductive inorganic compound are dispersed in an electrically insulating organic resin binder. Typical photoconductive particles include metal free phthalocyanine, such as copper phthalocyanine, quinacridones, 2,4-diaminotriazines and polynuclear aromatic quinines. Typical organic resinous binders include polycarbonates, acrylate polymers, vinyl polymers, cellulose polymers, polyesters, polysiloxanes, polyamides, polyurethanes, epoxies, and the like.

Initially, a portion of photoconductive belt 20 passes through a charging station, indicated generally by the reference letter A. At charging station A, a corona generating device 34 or other charging device generates a charge voltage to charge photoconductive belt 20 to a relatively high, substantially uniform voltage potential. The corona generator 34 comprises a corona generating electrode, a shield partially enclosing the electrode, and a grid disposed between the belt 20 and the unenclosed portion of the electrode. The electrode charges the photoconductive surface of the belt 20 via corona discharge. The voltage potential applied to the photoconductive surface of the belt 20 is varied by controlling the voltage potential of the wire grid.

Next, the charged photoconductive surface is rotated to an exposure station, indicated generally by the reference letter B. Exposure station B receives a modulated light beam corresponding to information derived by RIS 10 having a multicolored original document 38 positioned thereat. The modulated light beam impinges on the surface of photoconductive belt 20, selectively illuminating the charged surface of photoconductive belt 20 to form an electrostatic latent image thereon. The photoconductive belt 20 is exposed three times to record three latent images representing each color.

After the electrostatic latent images have been recorded on photoconductive belt 20, the belt is advanced toward a development station, indicated generally by the reference letter C. However, before reaching the development station C, the photoconductive belt 20 passes subjacent to a voltage monitor, preferably an electrostatic voltmeter 33, for measurement of the voltage potential at the surface of the photoconductive belt 20. The electrostatic voltmeter 33 can be any suitable type known in the art wherein the charge on the photoconductive surface of the belt 20 is sensed, such as disclosed in U.S. Pat. Nos. 3,870,968; 4,205,257; or 4,853,639, the contents of which are incorporated by reference herein.

A typical electrostatic voltmeter is controlled by a switching arrangement which provides the measuring condition in which charge is induced on a probe electrode corresponding to the sensed voltage level of the belt 20. The induced charge is proportional to the sum of the internal capacitance of the probe and its associated circuitry, relative to the probe-to-measured surface capacitance. A DC measurement circuit is combined with the electrostatic voltmeter circuit for providing an output which can be read by a conventional test meter or input to a control circuit, as for example, the control circuit of the present invention. The voltage potential measurement of the photoconductive belt 20 is utilized to determine specific parameters for maintaining a predetermined potential on the photoreceptor surface, as will be understood with reference to the specific subject matter of the present invention, explained in detail hereinbelow.

The development station C includes four individual developer units indicated by reference numerals 40, 42, 44 and 46. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface.

Developer units 40, 42, and 44, respectively, apply toner particles of a specific color corresponding to the compliment of the specific color separated electrostatic latent image recorded on the photoconductive surface. Each of the toner particle colors is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document.

In FIG. 1, developer unit 40 is shown in the operative position with developer units 42, 44 and 46 being in the non-operative position. During development of each electrostatic latent image, only one developer unit is in the operative position, while the remaining developer units are in the non-operative position. Each of the developer units is moved into and out of an position. In the operative position, the magnetic brush is positioned substantially adjacent the photoconductive belt, while in the non-operative position, the magnetic brush is spaced therefrom. Thus, each electrostatic latent image or panel is developed with toner particles of the appropriate color without commingling.

After development, the toner image is moved to a transfer station, indicated generally by the reference letter D. Transfer station D includes a transfer zone, defining the position at which the toner image is transferred to a sheet of support material, which may be a sheet of plain paper or any other suitable support substrate. A sheet transport apparatus, indicated generally by the reference numeral 48, moves the sheet into contact with photoconductive belt 20. Sheet transport 48 has a belt 54 entrained about a pair of substantially cylindrical rollers 50 and 52. A friction retard feeder 58 advances the uppermost sheet from stack 56 onto a pretransfer transport 60 for advancing a sheet to sheet transport 48 in synchronism with the movement thereof so that the leading edge of the sheet arrives at a preselected position, i.e. a loading zone. The sheet is received by the sheet transport 48 for movement therewith in a recirculating path. As belt 54 of transport 48 moves in the direction of arrow 62, the sheet is moved into contact with the photoconductive belt 20, in synchronism with the toner image developed thereon.

In the transfer zone, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this manner, three different color toner images are transferred to the sheet in superimposed registration with one another. Each of the electrostatic latent images recorded on the photoconductive surface is developed with the appropriately colored toner and transferred, in superimposed registration with one another, to the sheet for forming the multi-color copy of the colored original document. One skilled in the art will appreciate that the sheet may move in a recirculating path for four cycles when undercolor black removal is used.

After the last transfer operation, the sheet transport system directs the sheet to a vacuum conveyor, indicated generally by the reference numeral 68. Vacuum conveyor 68 transports the sheet, in the direction of arrow 70, to a fusing station, indicated generally by the reference letter E, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

The last processing station in the direction of movement of belt 20, as indicated by arrow 22, is a cleaning station, indicated generally by the reference letter F. A lamp 80 illuminates the surface of photoconductive belt 20 to remove any residual charge remaining thereon. Thereafter, a rotatably mounted fibrous brush 82 is positioned in the cleaning station and maintained in contact with photoconductive belt 20 to remove residual toner particles remaining from the transfer operation prior to the start of the next successive imaging cycle.

In accordance with the present invention, with reference to FIGS. 1 and 2, a paper path generally designated at 88 connects the output (printed) image paper path shown at 90 to raster input scanner (RIS) 10. The paper path 88 includes a suitable conveyer or belt system illustrated by the rolls 92 and 94 to initiate the conveyance of the copy sheet away from rolls 76 and output tray 78 by rolls 92 to RIS 10 to rolls such as rolls 94 at the entrance of RIS 10. Upon scanning of a copy sheet with a suitable calibration image by RIS 10, the copy sheet is exited from RIS 10 by suitable conveyance such as rolls 96 to a RIS output tray 98. It should be noted that a document handler as illustrated in dotted lines at 99 could also be provided and, in such case, the RIS output tray 98 could be the tray of document handler 99. A gate mechanism shown at 100 is suitably switched by signals from machine controller 102 to gate driver 104 to deflect copy sheets normally conveyed to out put tray 78 to rolls 92 and RIS 10.

Paper path 88 connecting rolls 90 to RIS 10 provides a calibration system for automatically allowing images printed on copy sheets to be scanned without operator intervention. Paper path 88 also enables a system in operative which a scanned image can be selectively used to determine various system characteristics such as nonuniformity problems to obtain color consistency within a page.

One way of using such a system is for the operator to initiate the process with a calibration image. After feeding the test image to the scanner portion of the system no other operations are necessary (except putting away the calibration image and the iterated output images). The printed image is automatically returned to the scanner and the color of the output patches are compared to the original. This process can be iterated until the original and the printed copy are within acceptable limits in color output and consistency.

Given that the scanner portion of the printing system is inherently more stable that the printing portion of the system, generally it would not be necessary to use a hardcopy calibrated original. In most cases an electronic version of the test image would be sufficient to test the calibration of the print engine. This process could be initiated at the request of an operator or simply as a fully automated maintenance operation.

With this approach the maximum amount of information regarding defects in printed copy can be measured. This would include some of the streaks, color drifts, process drifts etc. In addition variations based on the media can also be included into the calibration. Since the same input scanner is used, image processing software of the output image can be rendered to give relevant information depending on its use. When information about output $L^*a^*b^*$ values is required, constant areas of the size of a typical interdocument test patch can be located called "incidental test patch", in a customer image and that portion only scanned. It should be noted that image processing such as image rotation, translation, or stretching may be necessary to compare images to compensate for mechanical deviation of the overall system.

There are a number of other ways that automated calibration could greatly improve the functionality of a printing system. For example the automated process described above could also be useful to keep the output of a specific image stable. By feeding a previously printed image into the scanner, the system could automatically match it's current output to its previous output. Thus irrespective of the optimum calibration, the system could optimize its calibration for the gamut and frequency information in the original image. Another way for the operator to use this system is to calibrate specifically to their own input target. This target might be the color of a corporate logo, a specific facial tone, or any other color that has particular contextual significance for the user.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An imaging machine having an imaging member, operating components including a document scanner, and a control system including memory to provide images on copy sheets comprising:

a calibration image stored in memory, control data stored in said memory for automatically initiating a calibration sequence by projecting the calibration image onto the imaging member, a source of copy sheets, the calibration image being transferred from the imaging member to a first copy sheet, a copy sheet path to automatically convey said first copy sheet with the calibration image to the document scanner for scanning the calibration image on said first copy sheet, the calibration image being projected onto the imaging member and transferred to a second copy sheet, and a sensor to measure imaging machine parameters by sensing the calibration image on the second copy sheet to provide control data for machine adjustment.

2. The imaging machine of claim 1 wherein the sensor measures imaging machine parameters by sensing the calibration image on the first copy sheet to provide control data for machine adjustment.

3. The imaging machine of claim 1, wherein the calibration image stored in memory includes a test image to maintain color consistency.

4. The imaging machine of claim 1, wherein the calibration image stored in memory includes a test image to determine imaging member uniformity.

5. An imaging machine having an imaging member, operating components including a document scanner, and a control system including memory to provide images on copy sheets comprising:

a calibration image stored in memory, a copy sheet source, the calibration image being transferred to a first copy sheet, a copy sheet path to automatically convey the first copy sheet to the document scanner for scanning the calibration image, the calibration image being transferred onto a second copy sheet, and a sensor to measure printing machine parameters by sensing the calibration image on the second copy sheet to provide control data for machine adjustment, the memory including stored data to automatically initiate the transfer of the calibration image to said first copy sheet.

6. The imaging machine of claim 5 including a scanner tray for receiving copy sheets scanned by the document scanner.

7. The imaging machine of claim 5, wherein automatic initiation of the transfer of the calibration image to said first copy sheet depends upon machine usage.

8. The imaging machine of claim 5, wherein automatic initiation of the transfer of the calibration image to said first copy sheet depends upon predetermined time settings.

9. The imaging machine of claim 5 including an output tray for receiving copy sheets during normal machine operation and a deflector wherein upon automatic initiation of the transfer of the calibration image to said first copy sheet triggers said deflector to inhibit copy sheets entering the output tray.

10. The imaging machine of claim 5, wherein the calibration image stored in memory includes a test image to maintain color consistency.

11. The imaging machine of claim 5, wherein the calibration image stored in memory includes a test image to determine imaging member uniformity.

12. In an imaging machine having an imaging member, operating components including an input scanner for digitizing images for projecting onto the imaging member, a source of copy sheets, a control with memory, and a transfer member to transfer images projected onto the imaging member onto copy sheets, and a paper path for conveying copy sheets with images to the input scanner, a method of calibration of the imaging machine comprising the steps of:

providing an image on a first copy sheet, automatically conveying the first copy sheet to the input scanner by means of said paper path, responsive to data in the memory scanning said image on the first copy sheet, projecting said image onto the imaging member, and transferring said image to a second copy sheet, and sensing said image on the second copy sheet to calibrate the imaging machine, including the step of comparing the image on the second copy sheet to calibration data.

13. The method of claim 12 wherein the imaging machine includes a control with memory for storing calibration data and wherein the step of sensing said image on the second copy sheet to calibrate the imaging machine includes the step of comparing the image on the second copy sheet to said calibration data.

14. The method of claim 12 wherein the step of sensing said image on the second copy sheet to calibrate the imaging machine includes the step of comparing the image on the second copy sheet to the image on the first copy sheet.

15. The method of claim 12 including the steps of conveying the second copysheet to the input scanner by means of said paper path, scanning the image on the second copy sheet and providing the image on a third copy sheet, and sensing the image on the third copy sheet to calibrate the imaging machine.

16. The method of claim 12 wherein the image on the first copy sheet is a selected portion of a given image.

17. The method of claim 12 wherein the step of sensing said image on the third copy sheet to calibrate the imaging machine includes the step of comparing the image on the third copy sheet to the image on the second copy sheet.

* * * * *